United States Patent [19]

Hager

[11] Patent Number: 5,350,056
[45] Date of Patent: Sep. 27, 1994

[54] SELF-SUPPORTING CONVEYOR BELT WITH WIRE-FORMED SPACERS

[75] Inventor: Michael L. Hager, Eden, Md.

[73] Assignees: Cambridge, Inc., Cambridge, Md.; York Food Systems, Inc., Issaquah, Wash.

[21] Appl. No.: 77,064

[22] Filed: Jun. 16, 1993

[51] Int. Cl.⁵ .................................... B65G 21/18
[52] U.S. Cl. ........................................ 198/778
[58] Field of Search ............................ 198/778

[56] References Cited

U.S. PATENT DOCUMENTS

| | | |
|---|---|---|
| Re. 27,690 | 7/1973 | Roinestad et al. . |
| 1,626,492 | 4/1927 | Youngson . |
| 1,907,649 | 5/1933 | Marx . |
| 2,093,270 | 9/1937 | Glinka . |
| 2,219,724 | 10/1940 | Quick . |
| 2,278,361 | 3/1942 | Rapisarda . |
| 2,706,033 | 4/1955 | Williams . |
| 3,133,798 | 5/1964 | Feld et al. . |
| 3,225,898 | 12/1965 | Roinestad . |
| 3,261,451 | 7/1966 | Roinestad . |
| 3,270,863 | 9/1966 | Ackles . |
| 3,302,423 | 2/1967 | Morrison . |
| 3,315,492 | 4/1967 | Dreksler . |
| 3,319,778 | 5/1967 | Bessant . |
| 3,348,659 | 10/1967 | Roinestad . |
| 3,500,989 | 3/1970 | Cripe et al. . |
| 3,536,183 | 10/1970 | Locke . |
| 3,612,252 | 10/1971 | Yu . |
| 3,659,697 | 5/1972 | Brackmann et al. . |
| 3,664,487 | 5/1972 | Ballenger . |
| 3,750,859 | 8/1973 | Smith . |
| 3,774,524 | 11/1973 | Howard . |
| 3,886,762 | 6/1975 | Rothstein et al. . |
| 3,920,117 | 11/1975 | Roinestad . |
| 3,938,651 | 2/1976 | Alfred et al. . |

(List continued on next page.)

FOREIGN PATENT DOCUMENTS

| | | |
|---|---|---|
| 997702 | 9/1976 | Canada . |
| 0110856 | 6/1984 | European Pat. Off. ............ 198/778 |
| 0293095 | 11/1988 | European Pat. Off. . |
| 684922 | 10/1939 | Fed. Rep. of Germany . |
| 698360 | 11/1940 | Fed. Rep. of Germany . |
| 34766 | 12/1964 | Fed. Rep. of Germany . |
| 2544916 | 12/1976 | Fed. Rep. of Germany . |
| 2410392 | 12/1982 | Fed. Rep. of Germany . |
| 2063070 | 7/1971 | France . |
| 2220442 | 10/1974 | France . |
| 7402777 | 9/1974 | Netherlands . |
| 641868 | 3/1974 | U.S.S.R. . |
| 478843 | 2/1938 | United Kingdom . |
| 830287 | 3/1960 | United Kingdom . |
| 946317 | 1/1964 | United Kingdom . |
| 1090630 | 11/1967 | United Kingdom . |
| 1301655 | 1/1973 | United Kingdom . |
| 1420576 | 1/1976 | United Kingdom . |
| 1575729 | 9/1980 | United Kingdom . |
| 2072123 | 9/1981 | United Kingdom . |
| 2205545 | 12/1988 | United Kingdom . |

OTHER PUBLICATIONS

Scanima a/s "Spiral Freezers", brochure, 24 sheets (date unknown).
Frigoscandia Contracting "Gyrofreeze C" brochure, 5 sheets (date unknown).
Allied–Locke Industries brochure pages, 4 sheets (date unknown).

Primary Examiner—James R. Bidwell
Attorney, Agent, or Firm—Rothwell, Figg, Ernst & Kurz

[57] ABSTRACT

A self-supporting conveyor belt a portion of the length of which follows a helical conveying path comprising a plurality of stacked tiers. The belt includes a plurality of interconnected pivotal link members by which the belt can either collapse or extend along a side edge thereof to follow a curved path. Secured to the link members are wire-formed spacers which extend between adjacent belt tiers, the wire-formed spacers of one tier abutting and supporting an immediately overlying tier. The spacers provide the belt stack with increased lateral stability to prevent destacking while permitting air flow therethrough comparable to prior art spiral belts without spacers and supported by rails.

46 Claims, 9 Drawing Sheets

U.S. PATENT DOCUMENTS

| | | |
|---|---|---|
| 4,008,580 | 2/1977 | Heber et al. . |
| 4,023,381 | 5/1977 | Onodera . |
| 4,036,352 | 7/1977 | White . |
| 4,078,655 | 3/1978 | Roinestad . |
| 4,204,006 | 5/1980 | Emgard et al. . |
| 4,222,483 | 9/1980 | Wootton et al. . |
| 4,226,093 | 10/1980 | Voitko . |
| 4,260,053 | 4/1981 | Onodera . |
| 4,265,096 | 5/1981 | Andersson . |
| 4,338,055 | 7/1982 | Petersson . |
| 4,440,367 | 4/1984 | Daringer . |
| 4,448,301 | 5/1984 | Alger . |
| 4,450,953 | 5/1984 | Le Cann et al. . |
| 4,480,535 | 11/1984 | Jaxmar et al. . |
| 4,517,814 | 5/1985 | Rothstein . |
| 4,557,374 | 12/1985 | Bode . |
| 4,565,282 | 1/1986 | Olsson et al. . |
| 4,603,776 | 8/1986 | Olsson . |
| 4,662,509 | 5/1987 | Kaak . |
| 4,713,252 | 12/1987 | Ismail . |
| 4,741,430 | 5/1988 | Roinestad . |
| 4,748,029 | 5/1988 | Alfred et al. . |
| 4,753,815 | 6/1988 | Kielsmeier et al. . |
| 4,761,962 | 8/1988 | Andersson . |
| 4,814,190 | 3/1989 | Ismail . |
| 4,858,750 | 8/1989 | Cawley . |
| 4,867,301 | 9/1989 | Roinestad et al. . |
| 4,875,343 | 10/1989 | Jeppsson . |
| 4,878,362 | 11/1989 | Tyree, Jr. . |
| 4,894,245 | 1/1990 | Kielsmeier et al. . |
| 4,932,925 | 6/1990 | Roinestad et al. . |
| 4,940,133 | 7/1990 | Roinestad et al. ............... 198/778 |
| 4,941,567 | 7/1990 | Olsson . |
| 4,951,807 | 8/1990 | Roinestad et al. . |
| 4,955,465 | 9/1990 | Straight et al. . |
| 4,982,833 | 1/1991 | Straight et al. . |
| 5,031,751 | 7/1991 | Pahlsson . |
| 5,105,934 | 4/1992 | Cawley . |
| 5,141,102 | 8/1992 | Roinestad et al. . |
| 5,190,143 | 3/1993 | Froderberg et al. ............... 198/778 |

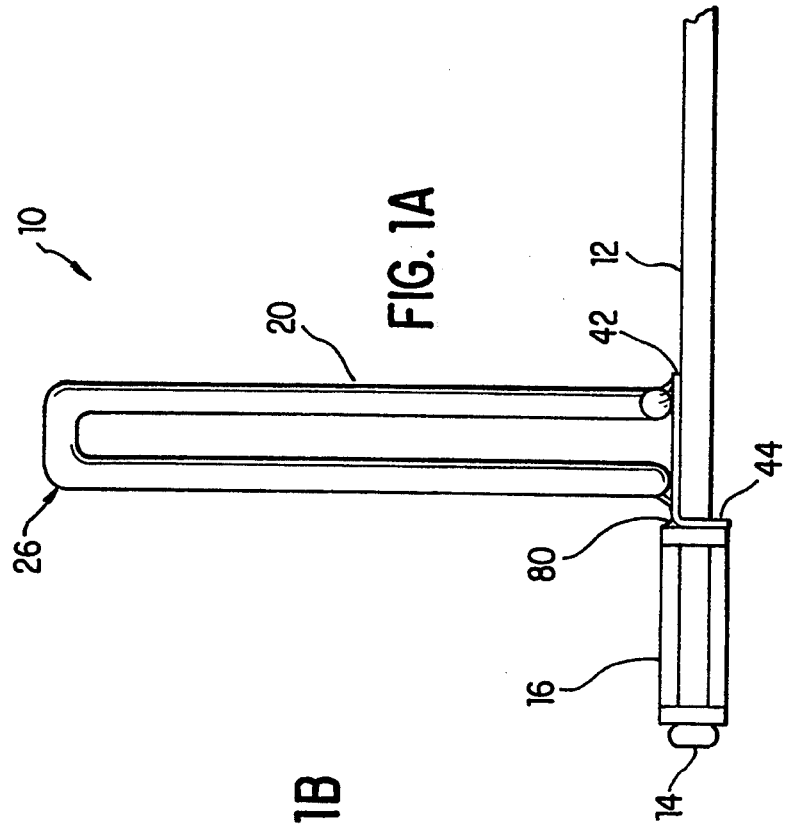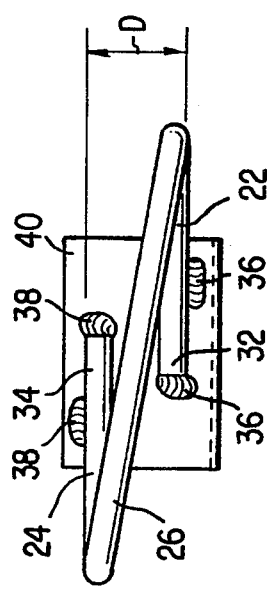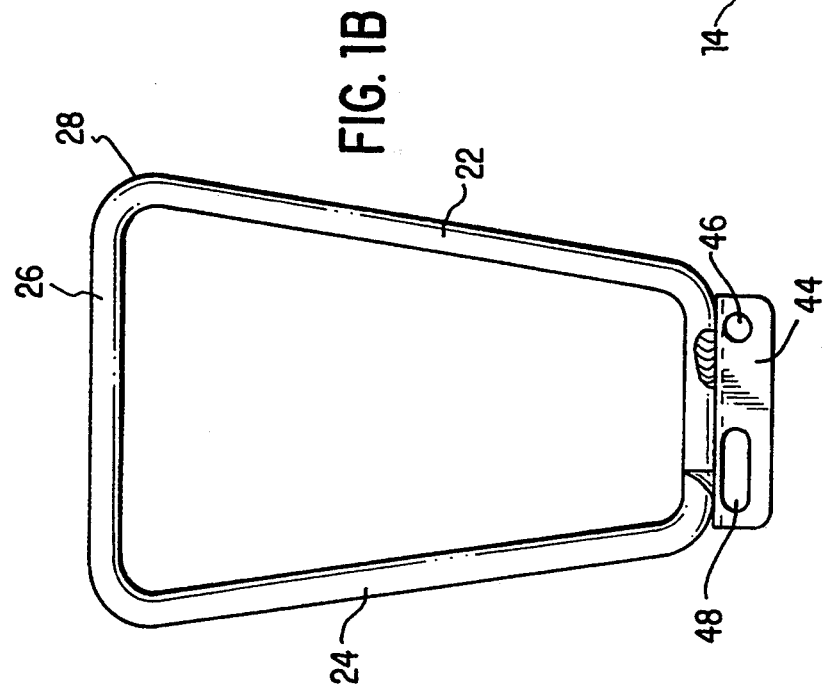

SELF-SUPPORTING CONVEYOR BELT WITH WIRE-FORMED SPACERS

BACKGROUND OF THE INVENTION

1. Field of the Invention

The present invention relates to a self-supporting conveyor belt in which a portion of the belt travels in a helical path including a number of superimposed belt tiers to form a spiral stack.

2. Description of the Related Art

It is known to use an endless conveyor belt in high volume production operations to provide long dwell times for the transported product as may be required by certain processes such as cooling or freezing. In such operations, a very long conveyor belt can operate in a relatively small space since the belt is moving in an upward or downward spiral path, whereas a straight line operation requires long conveyors and large amounts of plant floor space.

A known conveyor system of this type is disclosed in U.S. Pat. No. 3,348,659 to Roinestad. In this system, the belt is frictionally driven on the inside edge. The belt is supported by rails which may be covered with a plastic material to reduce friction. The vertical space required for the system is determined by the product height and the dimensions of the belt support structure.

Another known conveyor system is described in U.S. Pat. No. 3,938,651 to Alfred et al. Such belt is self-supporting on both edges which results in a simplified construction and a reduced overall height for the system as compared to systems with belt supports under each tier. This system uses a conveyor belt with links on both sides which are formed as spacers whose upper edge portions are arranged to bear against the lower edge portions of the links of the overlying tier of the endless conveyor belt. As discussed therein, the spacer members contact the underside of the links in the overlying belt tier so that the belt is completely self-supporting, i.e., it need not be supported by guide rails, strips, or similar members, unlike the conveyor belt disclosed in U.S. Pat. No. 3,348,659, discussed above.

Some significant problems exist with self-supporting spiral conveyor belts in use today. One such problem is the potential for the stack of belt tiers to tip over when there is no positive means of maintaining alignment. This problem, commonly referred to as "destacking," frequently results in a significant amount of damaged belting. Attempts to solve this problem of guiding the belt tiers include forming the spacer members with special structure for receiving the top edge of the spacer members of an underlying tier to align the two tiers. See, for example, U.S. Pat. No. 4,858,750 in which the lower edge of the spacer has a central groove to receive the top edge of an adjacent spacer, and U.S. Pat. No. 4,875,343 in which the lower edge of a spacer plate includes opposed tabs which form a V-shaped recess to receive the top edge of an adjacent spacer.

The conveyor systems described above require that the spacer of the underlying belt tier be precisely aligned with the spacer in the overlying tier, thus increasing the possibility of destacking. Moreover, the specially formed mating spacer structure results in a fairly complex arrangement which may result in belt hang-up or catching which also increases the probability of destacking.

Another problem encountered in applications of the aforementioned self-supporting conveyor belts is that access through the side plates to treat the product with, e.g. air, liquid nitrogen or $CO_2$, is limited. Further, visibility, cleanability, and ability to adjust or direct air flow is impaired. While the conveyor belt disclosed in U.S. Pat. No. 3,938,651 shows central apertures in the spacer plates for passage of treating material, in practice such apertures must be relatively small in order to maintain the structural integrity of the plates. In other words, if the aperture is made large enough to allow substantial flow of treating material then the spacer plates will not be able to support the weight of the overlying belt tiers, which weight is substantial for the lowermost tier.

Accordingly, there is a need in the art for a self-supporting helical conveyor belt which is free of the aforementioned problems.

SUMMARY OF INVENTION

The present invention provides a self-supporting conveyor belt a portion of the length of which follows a helical conveying path comprising a plurality of stacked tiers. The belt includes a plurality of interconnected pivotal link members which allow the belt to follow a curved path, or traverse a sprocket either an upward or downward direction when following the straight-line path. Secured to the link members are wire-formed spacers which extend between adjacent belt tiers, the wire-formed spacers of one tier abutting and supporting an immediately overlying tier. The belt may also include a wire mesh or plastic overlay to provide a carrying surface.

In a preferred embodiment, the wire-formed spacers are located inward, i.e., toward the center of the belt, from the link members and extend from the upper surface of a belt tier to contact transverse rod members of an overlying belt tier. The alignment between the spacers and the overlying belt tier is not critical since the upper surface of each spacer simply contacts transverse rods, i.e., members extending across the width of the belt, as opposed to a specially constructed link or spacer member with a track or groove. This permits some lateral movement of the tier while maintaining a stacked condition. A center drum including vertical bars, or optionally having a continuous surface, is preferably used to engage the link members and transverse rod heads on the inside edge of the belt to provide precise stack alignment which prevents destacking.

The wire-formed spacer is preferably in the form of a substantially closed loop with two vertical legs and a horizontal leg. The ends of the vertical legs are secured to a support member which is separate from and attached to the link member, or optionally, the ends can be secured to a support member which is formed as an integral extension of the link member. Further, the wire-formed spacer can be secured to a support member which is not attached directly to the link member, but is captured between the link member and the enlarged head of the transverse rod. Still further, the wire-formed spacer can be secured directly to the link member so as to extend directly above the link and contact the underside of the link of the overlying tier to support the same.

In an alternative embodiment, the spacer is secured to the support member at the end of one vertical leg and at a portion adjacent the end of the other vertical leg. The end of the other vertical leg of the spacer projects outwardly from the link member parallel to the transverse rods and is engaged by means for feeding and lifting the belt into and from the helical stack.

The portions of the spacer where the horizontal leg joins the vertical legs are rounded to form a smooth radius. These rounded corners engage the overlying tier in a sliding manner and prevent the belt from getting caught or hung up on the overlay or links if the belt is forced out of alignment, unlike the prior art spacers.

The ends of the vertical legs of each spacer are secured to the link member so as to be spaced from each other to provide a wide stance or base which increases the lateral stability of the belt. Increased lateral stability is highly desirable as it decreases the likelihood of destacking.

The wire-formed spacers are preferably formed of a high-temper steel wire or reinforced plastic which resists permanent deformation in the event of a belt jam or heavy load. This structure provides the spacers with substantial load bearing capability, while the small surface area of the wire also provides a relatively large open area for passage of treating material as compared to the prior art sheet metal spacers.

In an alternative embodiment, the outside of the link members is formed with a tab portion to which the transverse rods are secured to pivotally interconnect the link members. This eliminates the need for a formed head on the transverse rods which head is typically secured to the link members. A removable plastic cap preferably covers the tab portion to, provide a non-metallic inside belt edge for engaging the center drum. This tab portion can also be used to feed and lift the belt to and from the stack. It is also possible to form one edge of the belt with these plastic covered tab portions for engagement by a support rail and the other edge with the above-described wire-formed spacers to provide a belt that is self-supporting on only one edge.

Another variation of the invention uses a tubular spacer member or larger cross rod to create a smooth surface on the underside of the belt. This reduces the possibility of the belt edge catching on a support rail.

BRIEF DESCRIPTION OF THE DRAWINGS

The conveyor belt of the present invention is exemplified in the following description, making reference to the accompanying drawings, wherein:

FIG. 1A is a front elevational view of the wire-formed spacer according to the invention;

FIG. 1B is a side elevational view of the spacer according to the invention;

FIG. 1C is a top plan view of the spacer in accordance with the invention;

DETAILED DESCRIPTION OF THE PREFERRED EMBODIMENTS

Figure 2:
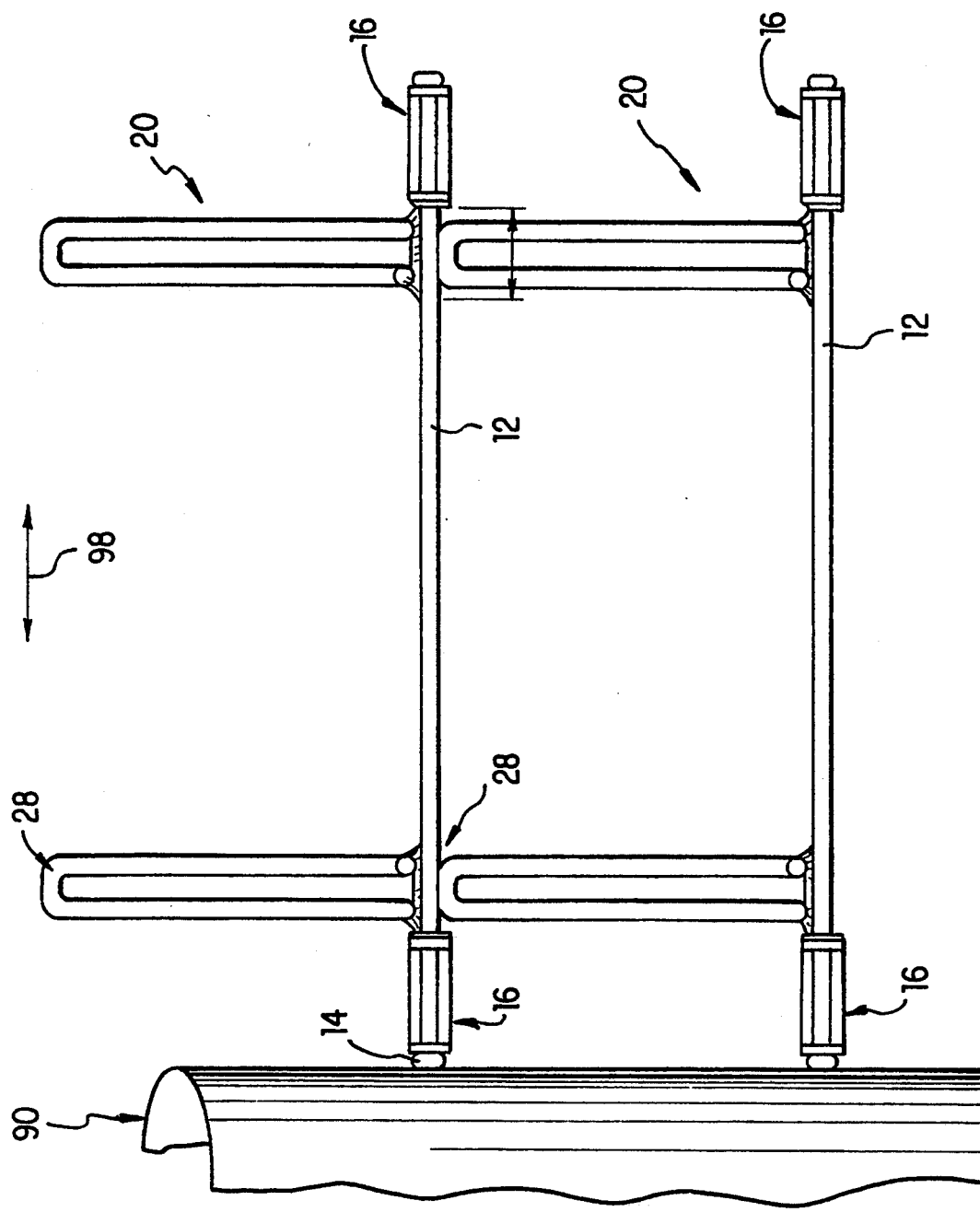
FIG. 2 is a front elevational view of a portion of a belt stack including the wire-formed spacers and a center drum engaging the inside edge of the belt stack.

With reference to FIGS. 1A–1C, a first embodiment of a conveyor belt according to the present invention indicated generally at 10 includes a plurality of transverse rods or cross members 12 and link members 16. The rods 12 have enlarged heads 14 on each end thereof which ends are secured to respective links 16 on opposite lateral side edges of the belt to provide articulated link members. The links 16 may be collapsed to allow the belt 10 to travel along a curved path including a plurality of stacked tiers as is known in the art.

According to the present invention, spacer means in the way of wire-formed spacers indicated at 20 are secured to the links 16 and extend upwardly therefrom. The term "wire-formed" is used for convenience and it will be understood that such term does not denote a specific shape or dimension as used herein. Although spacers 20 are shown to have a circular cross-section, such shape is exemplary only and it will be appreciated that spacers 20 can take other shapes. The wire-formed spacer 20 includes two lower substantially vertical legs 22, 24 and a top horizontal leg 26. The junctures of leg 26 with legs 22, 24 are in the form of rounded corners 28 as will be discussed hereinafter.

The spacer 20 is secured to a support member 40 in the form of an L-shaped link or bracket. Support member 40 is secured to link 16 at 80 by suitable means, e.g. a weld, and has a horizontal upper portion 42 and a vertical lower portion 44, which lower portion 44 has an aperture 46 and a slot 48 for receiving respective transverse rods 12. The upper portion 42 is preferably welded to rod 12. The aperture 46 receives a rod 12 which rod is secured, e.g. welded, to the link 16. The slot 48 receives an adjacent rod 12 so as to permit the rod to move within said slot. The aperture 46 and slot 48 of support member 40 correspond to the aperture and slot of the link 16 to which member 40 is secured, i.e., each member 40 is secured to a link 16 with the respective apertures and slots of each aligned and receiving adjacent rods 12.

This structure of links 16 and rods 12 which permits the belt to collapse and expand as it follows a curved path or traverses a sprocket wheel as is known in the art is shown in the patents mentioned above, e.g., U.S. Pat. Nos. 3,938,651 and 4,858,750, both of which are incorporated herein by reference. The support member 40 of the present invention is secured to a link 16 so as to move with the link as a unit.

The spacer 20 is configured as a substantially closed loop with end 32 of leg 22 and end 34 of leg 24 rigidly attached to the upper portion 42 of support member 40 at 36 and 38, respectively, by any suitable means, e.g., welding. As seen in FIG. 1C, ends 32 and 34 are attached to upper portion 42 so as to be spaced from each other a distance D in a direction extending across the width of the belt. This spacing provides a wide stance or base for wire-formed spacer 20 which gives the belt increased lateral stability with the spacer 20 not apt to being deformed or deflected under the load of overlying belt tiers. This lateral stability is not provided by the prior art spacer plates which typically have a flat sheet-like lower edge formed as part of the link or disposed adjacent to the link. This lower edge of the prior art spacer plates has essentially the same thickness as the plate body which makes these spacer plates easier to deform or bend under loads by lateral forces than the wire-formed spacers of the present invention.

FIG. 2 shows two belt tiers with the spacers 20 of the present invention secured to each and a center drum 90 engaging the inside edge of each tier. As can be seen the spacers 20 engage the underside of transverse rods 12 of the overlying tier. The smooth rounded corners 28 at the top of each spacer 20 prevent the spacer from getting caught or hung up on the rods 12 or the metal or plastic overlay (not shown) typically disposed over the rods if the belt is forced out of alignment. The spacers 20 allow some lateral movement of the tiers, i.e., in the direction indicated by arrow 98 in FIG. 2, since the rods 12 of each belt tier can slide on the upper leg 26 of the spacers 20. This prevents jamming and destacking as compared with prior art spacers which engage a special groove or track and are not designed to move or float laterally outside the groove. As stated above, the spacers 20 of the present invention permit the belt to be pulled outside the normal path as it will slide back without getting caught since no precise alignment is required.

Figure 3:
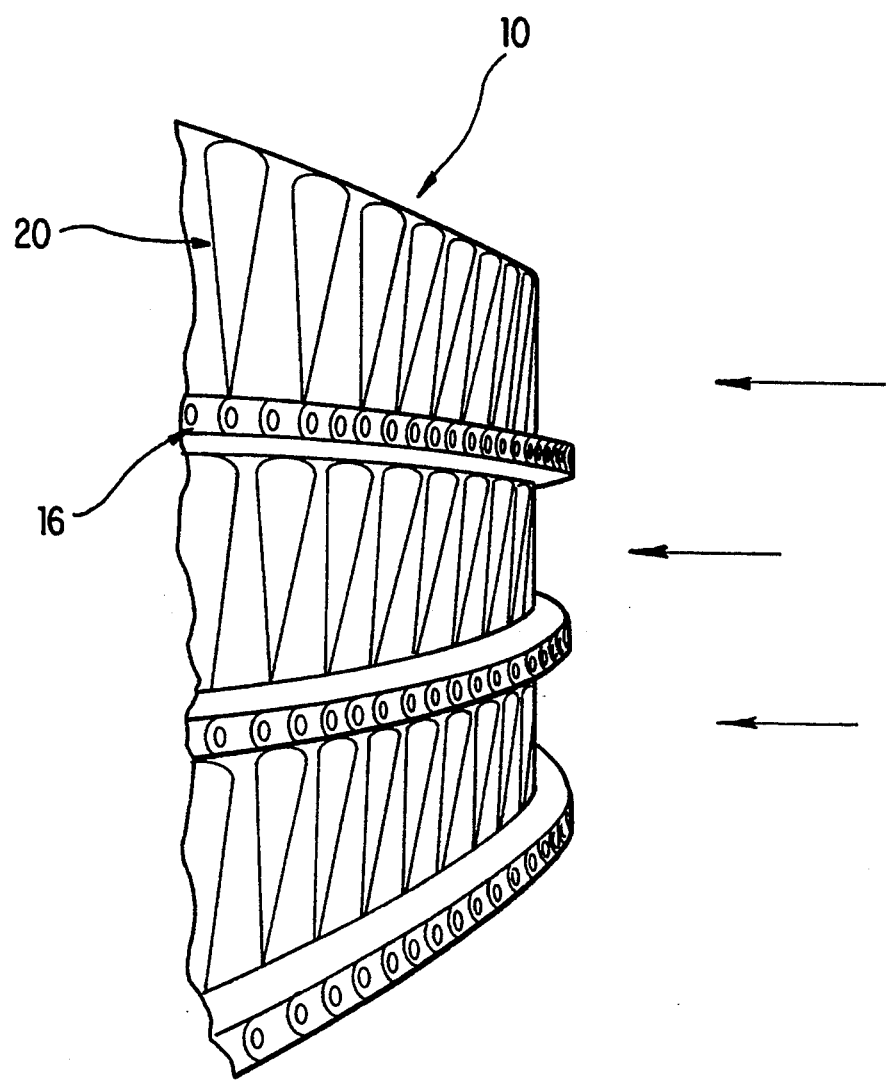
FIG. 3 is a perspective view of a portion of the belt stack showing lateral air flow through the stack.

FIG. 3 shows the substantial amount of open area provided on the outer surface of the belt stack by spacers 20 for the passage of treating material such as air, liquid nitrogen or $CO_2$, etc., to the conveyed product. The arrows indicate the lateral flow of air or the like into the belt stack. Because of the small surface area of the spacers 20, the airflow through the belt stack is comparable to that achieved with prior art belts having no spacers or sideplates. As stated above, the amount of material which can be punched out of prior art sideplates to provide airflow is limited by the strength requirements of the plates. In contrast, the wire-formed spacers 20 of the present invention provide substantial airflow without compromising the strength or integrity of said spacers.

Figure 4A:
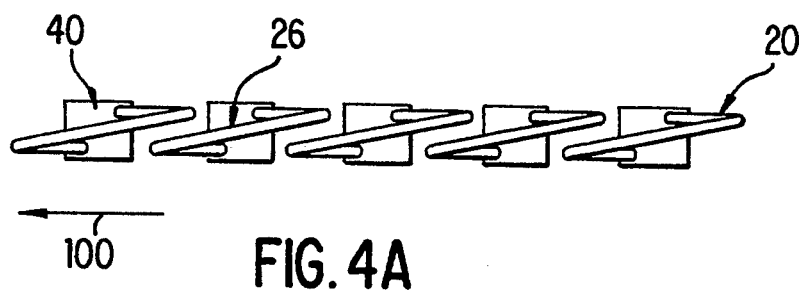
FIG. 4A is a top plan view of the wire-formed spacer according to the invention.

FIG. 4A, which shows the spacers from above, illustrates the manner in which the upper leg 26 of each spacer 20 is angled with respect to the direction of belt travel (indicated by arrow 100) to facilitate overlapping of adjacent spacers as the belt 10 follows a reverse bend. FIG. 4C. shows the spacers 20 as the belt travels around a sprocket or pulley (not shown), illustrating the clearance needed as the upper legs 26 of each spacer overlap as the belt undergoes a reverse bend.

Figure 4B:
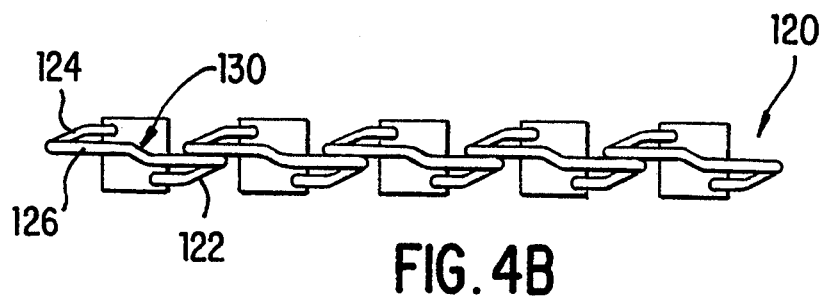
FIG. 4B is a top plan view of a second embodiment of the wire-formed spacers of the invention.
Figure 4C:
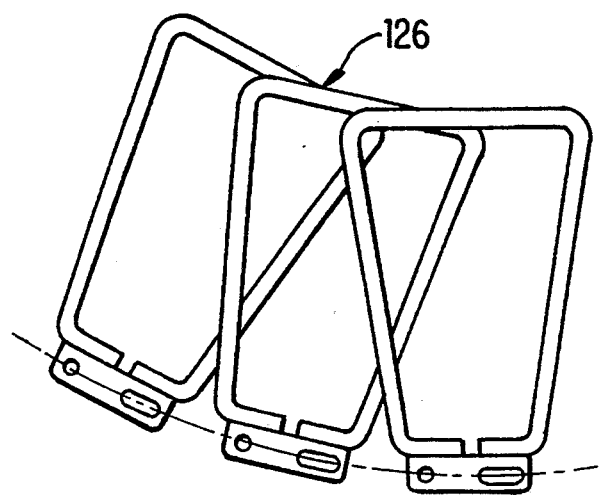
FIG. 4C is a side elevational view of the spacers as the belt traverses a sprocket or pulley to change direction in a straight path.

FIG. 4B shows an alternative embodiment of the spacers of the present invention indicated at 120. The spacers 120 include vertical legs 122 and 124 and a horizontal upper leg 126 which has an offset 130 at its midpoint. This offset 130 divides upper leg 126 into two portions which are laterally spaced in a direction extending across the width of the belt. As seen in FIG. 4B, this offset provides spacers 120 with the necessary clearance needed when said spacers 120 overlap as the belt follows a reverse bend as discussed above.

Figure 5A:
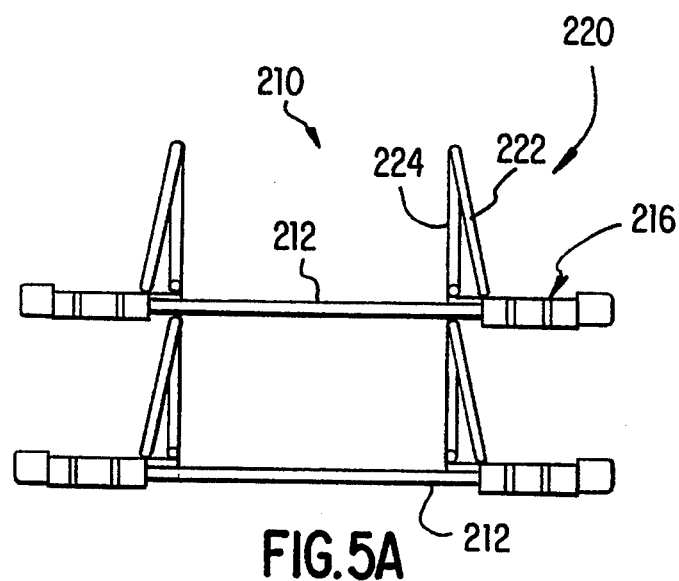
FIG. 5A is a front elevational view of a third embodiment of the invention.
Figure 5B:
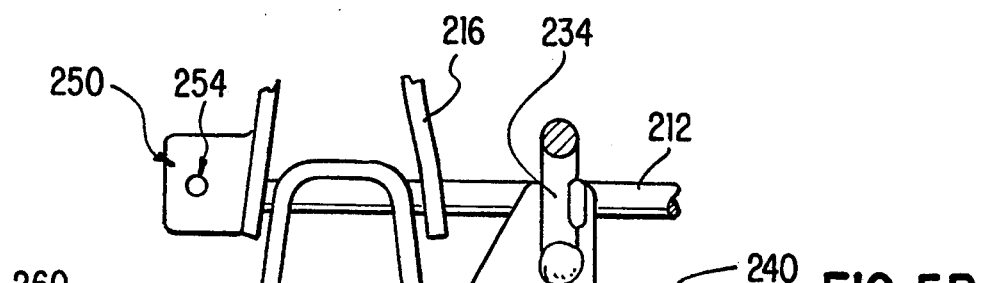
FIG. 5B is a top plan view of the embodiment of the belt shown in FIG. 5A.
Figure 5C:
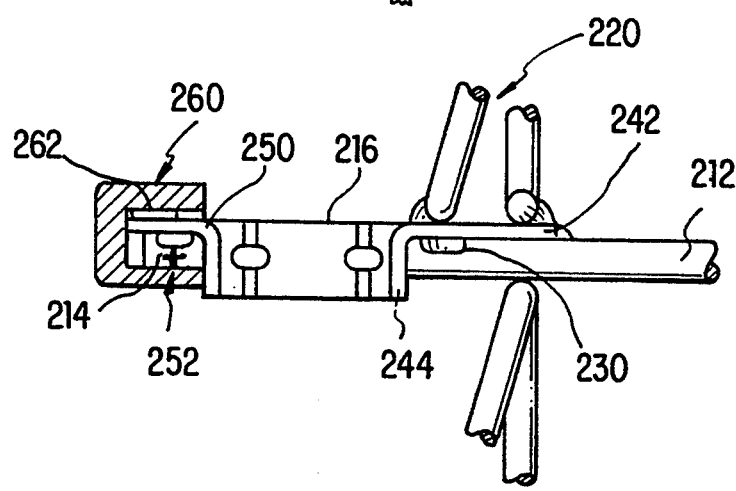
FIG. 5C is a front elevational view of the embodiment shown in FIGS. 5A and 5B.

A further embodiment of the present invention is shown in FIGS. 5A–5C wherein spacers 220 are secured to links 216 of belt 210. The belt of this embodiment includes a plurality of transverse rods 212 which pivotally interconnect links 216 disposed on opposite lateral edges of the belt 210. The links 216 are formed with an integral L-shaped platform 240 on one side thereof to which spacers 220 are secured. The spacers 220 can be the same as spacers 20 and 120 described above, differing in the support member to which they are attached. The platform 240 includes an upper horizontal portion 242 and a vertical lower portion 244 as shown in FIG. 5C. The spacers 220 are fixed to the upper portion 242 by any suitable means, e.g. by welding.

The side of link 216 opposite platform 240 is formed with an L-shaped tab 250 the top leg of which extends outward in a direction generally parallel to the rods 212. The rods 212 have an essentially continuous diameter from end-to-end and are formed without an enlarged head or the like, which in the prior art typically extends through the side of the link and is welded to the outer edge of the link. The end 214 of rod 212 is secured by welding or the like to the underside of the tab 250 as seen in FIG. 5C. This embodiment eliminates the formed head 14 present on the rod of the previous embodiments. The rod 212 is secured at 230 to the upper portion 242 on the opposite side of platform 240 as in the previous embodiments.

A cap member 260 is shown disposed over tab 250 to provide a smooth non-metallic belt edge as seen in FIGS. 5A–5C. This enables the use of a metal center driving drum without the usual plastic covering which is used to reduce wear and metallic contamination. The cap member 260 is preferably made of plastic and includes an inwardly extending protuberance 262 which cooperates with an aperture 254 in tab 250 to removably secure cap 260 to tab 250 of link 216. Further, the tab 250 can be supported on a known guide rail, e.g. a helical guide rail surrounding the belt stack, to support this edge of the belt.

It will be appreciated that the present invention encompasses using the combination of the outer tab 250, and the headless rod 212 and cap 260 of link 216, with either the integral support platform 240 of FIGS. 5B and 5C or the separate support member 40 of FIGS. 1A–1C. Another possible combination would include the headed rod with a link using either the integral support platform or the separate support member.

Figure 6A:
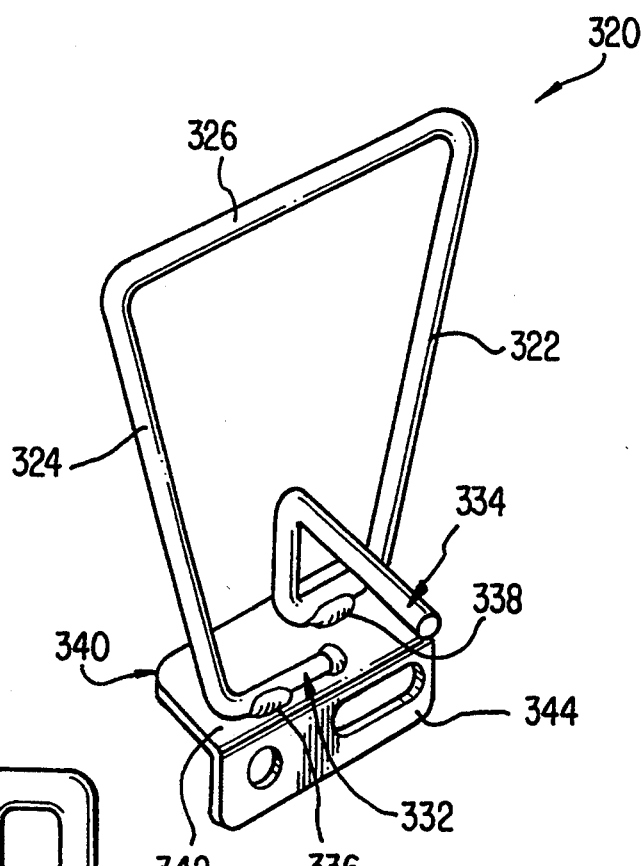
FIG. 6A is a perspective view of a fourth embodiment of the present invention.
Figure 6B:
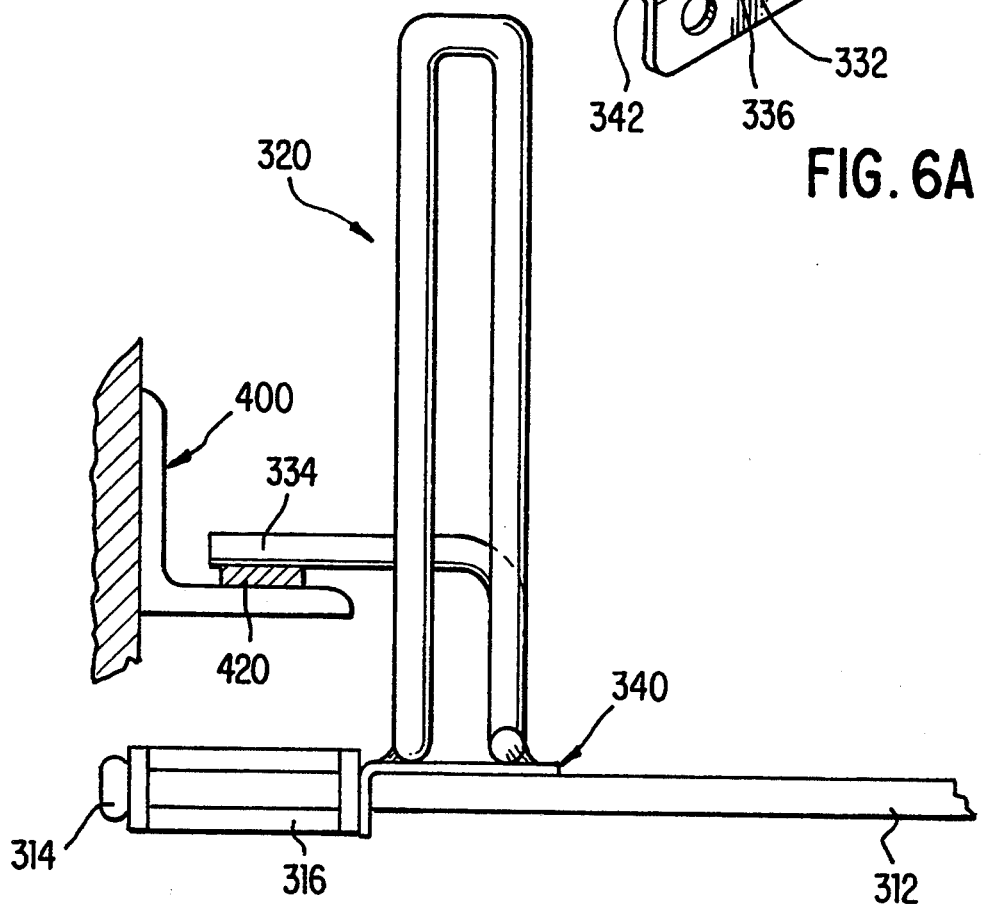
FIG. 6B is a front elevational view of the embodiment shown in FIG. 6A.

FIGS. 6A and 6B show a further embodiment of the present invention wherein spacer 320 is secured to a support member 340 which support member is secured to a link 316 and transverse rod 312 as in the above embodiments. Spacer 320 has lower legs 322 and 324 which are joined to a top leg 326 to formed rounded corners as discussed above. One end 332 of spacer 320 is secured to the upper portion 342 of support 340 at 336 by suitable means such as weld 336. The other end 334 of spacer 320 extends outward from the center of the belt for engagement by means 400 for feeding and lifting the belt into and from the belt stack as shown in FIG.

6B. An example of such means is support rail 400 with a strip 420 made of, e.g., plastic, secured thereto to reduce friction. The spacer 320 is secured to portion 342 of support 340 at an area 338 spaced from the outwardly extending end 334 as seen in FIG. 6A.

It will be understood that the spacer 320 of FIGS. 6A and 6B can be used with either type of support, i.e., the separate support of FIGS. 1A–1C or the support integral with the link of FIG. 5A–5A, as well as either type of transverse rod and link edge structure, i.e., the rod with an enlarged head of FIGS. 1A–1C or the headless rod and link with a tab of FIGS. 5A–5A.

Figure 7:
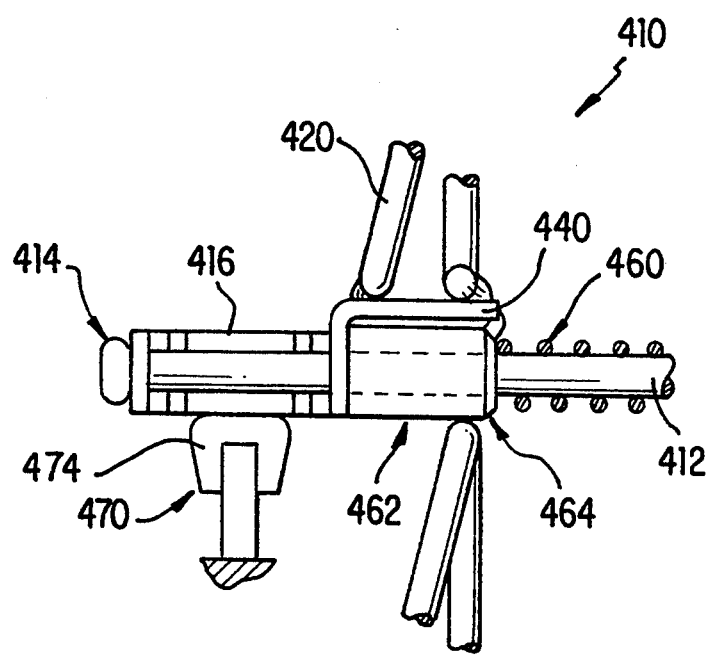
FIG. 7 is a front elevational view of a fifth embodiment of the present invention.

FIG. 7 shows a fifth embodiment of the present invention where belt 410 includes transverse rods 412 with overlay 460 and links 416. Wire-formed spacers 420 are secured to support members 440 which can be either integral with the links, as seen in FIG. 5A–5C, or separate from and secured to the links as seen in FIG. 1. This embodiment includes hollow spacing members 462 which are disposed over rods 412 to extend the underside of the rods 412 so as to be coextensive with the underside of links 416 for reasons described below.

Figure 8:
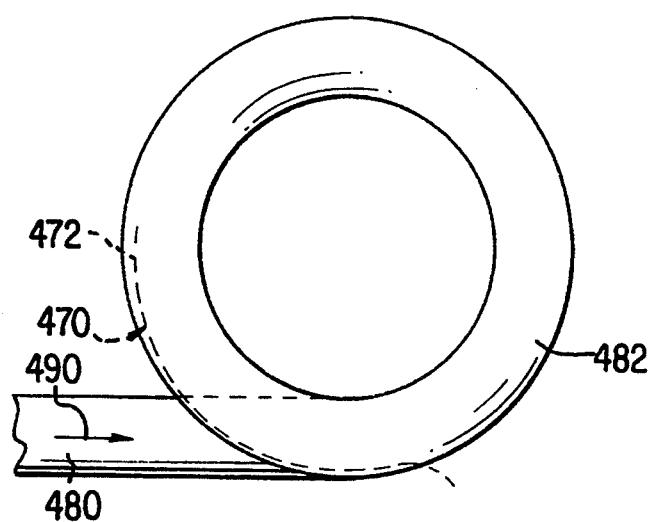
FIG. 8 is a top plan schematic view of the lowermost tier of the belt stack showing the support rail.

As seen in FIGS. 7 and 8, the incoming belt section 480 enters the belt stack in the direction of the arrow 490 and forms the first tier 482 of the stack. This first tier 482 is engaged on its underside by a support rail 470 which rail lifts the tier above the incoming section 480. As shown, rail 470 has a cover member 474 for engaging the belt. The rail initially engages the tier 482 near the area where spacers 420 are disposed, i.e., away from the outer edge of the belt as seen by the dashed line in FIG. 8, in order to lift the belt tier. However, the support rail 470 must move toward the link area of the belt tier 482, i.e., toward the outer edge of the belt, as the tier starts to overlie the incoming section 480 in order for the wire-formed spacers 420 to begin supporting this tier 480 as it becomes the second tier in the belt stack. This movement of the support rail is necessary so that the rail 470 does not interfere with the spacers 420 disposed inward of the outer edge.

In order to overcome possible snagging or catching of the support rail 470 on the links 416 or support members 440 as it moves towards the outer edge of the belt, a spacer member 462 is provided on the rods 412 as seen in FIG. 7. This spacer member 462 is preferably a hollow tubular member disposed over the rod 412 so as to make the bottom edge of the rod continuous with the bottom edge of the link 416 and support member 440, thus allowing the support rail 470 to move freely along the underside of the belt without getting caught or hung up. The edge 464 of spacer member 462 nearer the center of the belt is chamfered to allow the wire-formed spacers 420 to move along the rods 412 without getting caught on the edge 464.

While the spacer member 462 is shown to extend as far as the upper leg of support member 440 (toward the center of the belt), it will be recognized that it can extend further. It will also be recognized that the hollow spacers 462 can be utilized with any of the previous embodiments, e.g., belts including either the headed rod or the headless rod and tab, the support member integral with the link or the support member separate from and attached to the link, or various combinations thereof.

A further possible construction which provides a smooth continuous underside, without separate tubular spacer members 462, to prevent catching of the support rail 470 includes larger diameter transverse rods. A portion of each rod (or, optionally, the entire rod) is sized so as to be substantially coextensive with the bottom of the links 416 and support members 440 to permit free sliding of rail 470.

Figure 9:
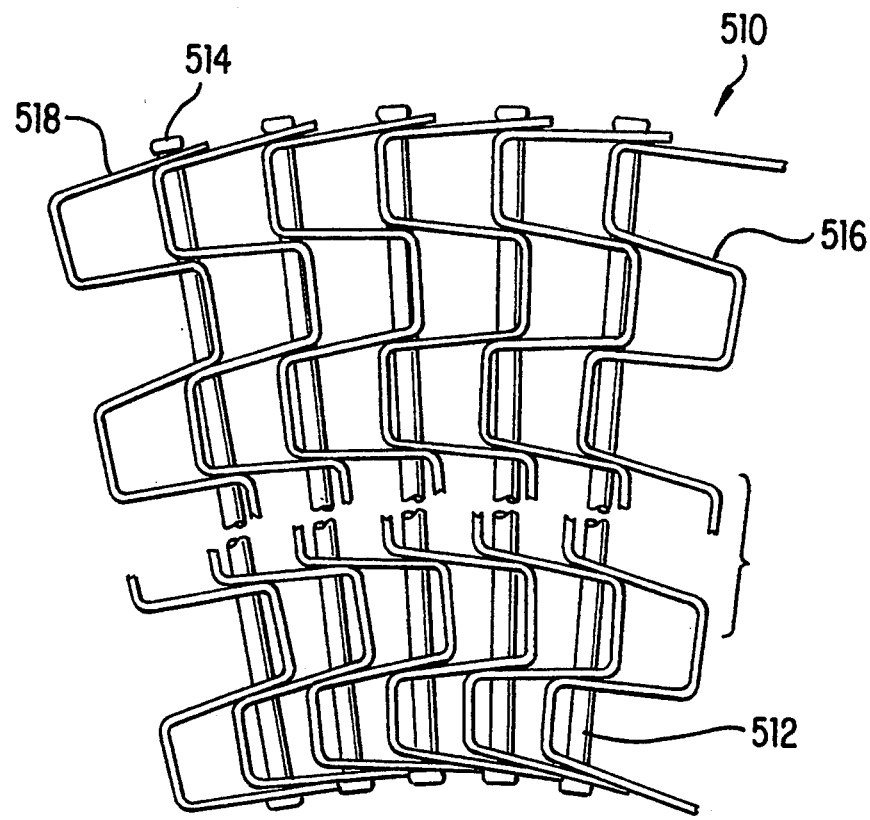
FIG. 9 is a top plan view of a conventional conveyor belt in which the links are flat convoluted strips.
Figure 10:
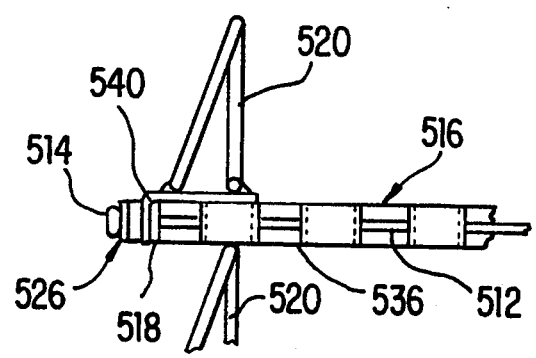
FIG. 10 is a front elevational view of the belt shown in FIG. 9 modified according to a sixth embodiment of the present invention.

A sixth embodiment of the present invention is shown in FIGS. 9 and 10 where belt 510 is of a flat link construction. This belt includes transverse rods 512 which pivotally secure links 516 together. The links 516 are formed of flat sheet metal bent so as to have alternating U-shaped recesses as is known in the art and as seen in FIG. 9. FIG. 9 shows the belt without the wire-formed spacers of the present invention disposed thereon.

According to the present invention, wire-formed spacers 520 are secured to support members 540 and are disposed between the rod heads 514 and the ends 518 of the links 516. In FIG. 10, reinforcing links 526 are disposed between the rod heads and the outer edge of links 516. The support members 540 are sandwiched between the rod heads 514 and reinforcing links 526 and are held in place without permanently attaching the support members 540 to the rod heads or links 516.

It will be appreciated that the wire-formed spacers 520 can be used on this type of belt without reinforcing links, as shown in FIG. 8. As seen in FIG. 9, the spacers 520 contact the underside of the above belt tier in a manner similar to the above-described embodiments. In this embodiment, the tubular spacer 462 of FIG. 7 is not needed as the support rail can freely slide along the lowermost belt tier without getting caught since the underside of each link is continuous along the length of the rods 512.

Figure 11A:
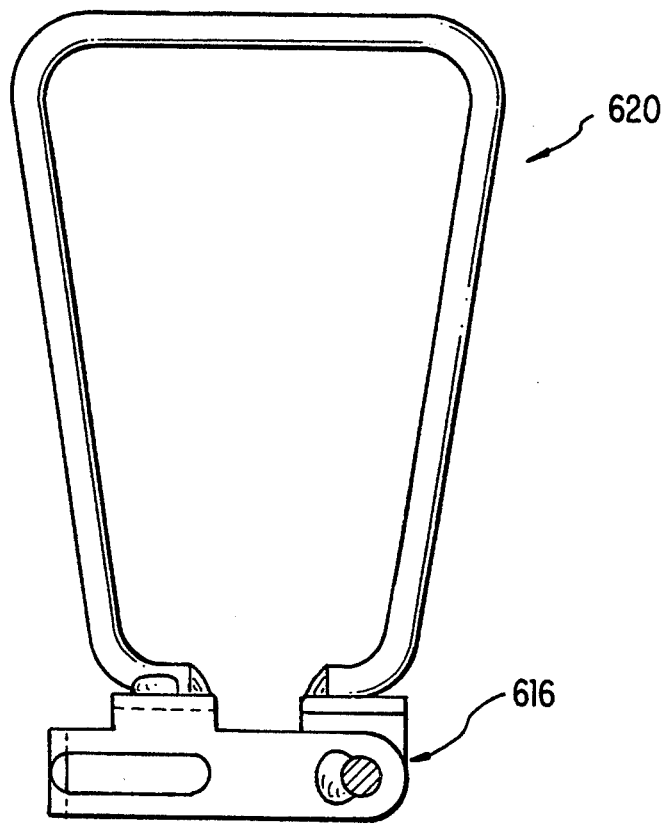
FIGS. 11A–11C are, respectively, a side elevational view, a top plan view, and a front elevational view of a wire-formed spacer according to a seventh embodiment of the present invention.
Figure 11B:
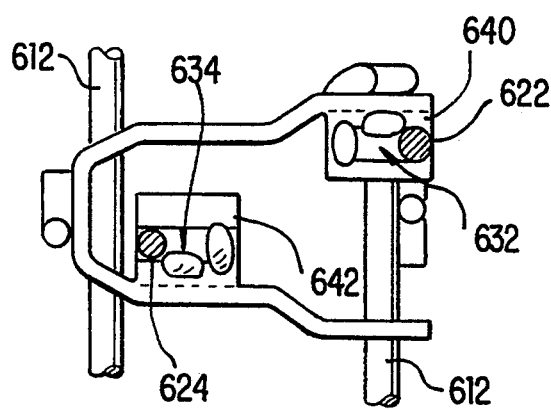
Figure 11C:
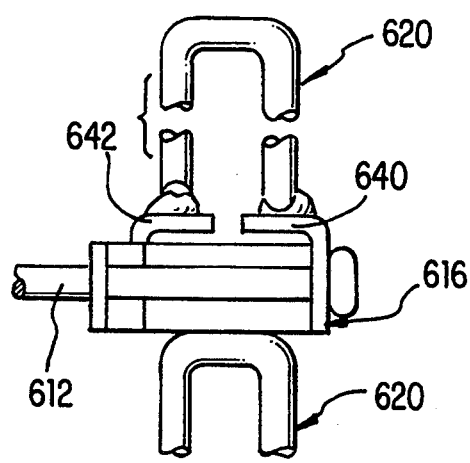

A seventh embodiment of the present invention is shown in FIGS. 11A–11C where wire-formed spacers 620 are secured directly to links 616 so as to extend directly above the links. As depicted in FIG. 11B, which is a top view of FIG. 11A with the legs of wire-formed spacer 620 sectioned at 622 and 624, link 616 has two platform portions 640, 642 to which the ends 632, 634 of the spacer's legs are secured by any suitable means, e.g., welding. FIG. 11C is a front view showing the spacers 620 engaging the underside of the links 616, as opposed to engaging the transverse rods as in the previous embodiments. The spacers 620 have a smooth contoured top leg with rounded corners to prevent the spacers from catching on the underside of the links as described above.

It will be recognized that the wire-formed spacers and/or the modified link and rod structure of the present invention can be utilized on various types of spiral conveyor belts known in the art, including those having links which are collapsible and those having links which are extendible along at least one side edge thereof.

Although the invention has been described in connection with certain preferred embodiments, it is not limited to them. Modifications within the scope of the following claims will be apparent to those skilled in the art.

What is claimed is:

1. A conveyor belt of the type having at least one side edge capable of collapsing or extending to permit the belt to be coiled in a helical belt stack with superimposed tiers; the belt comprising: a plurality of transverse rods extending between opposite side edges of the belt;
   a plurality of links joining adjacent transverse rods together so as to permit the belt to assume a curved configuration; and
   a plurality of spacers secured to said belt and projecting upwardly from the belt so as to engage at least some of the transverse rods of an overlying belt tier of the belt stack to permit said overlying belt tier to move laterally relative the underlying belt tier with the spacers moving along an underside of the transverse rods of the overlying belt tier;

whereby the overlying and underlying belt tiers can move relative each other in said lateral direction without the belt tiers destacking.

2. A conveyor belt as in claim 1, wherein said spacers are wire-formed and include at least one wire member secured to at least one of said plurality of links.

3. A conveyor belt as in claim 2, wherein the wire member has two ends and each end is secured to a support member formed as an integral extension of said at least one of the plurality of links.

4. A conveyor belt as in claim 2, wherein the wire member has two ends and each end is secured to a support member which is separate from and attached to said at least one of the plurality of links.

5. A conveyor belt as in claim 3, wherein the two ends of said wire member are secured to the support member so as to be spaced in a direction extending between the side edges of the belt to provide the spacers with a wide base for increased lateral stability.

6. A conveyor belt as in claim 4, wherein the two ends of said wire member are secured to the support member so as to be spaced in a direction extending between the side edges of the belt to provide the spacers with a wide base for increased lateral stability.

7. A conveyor belt as in claim 2, wherein the wire member is in the form of a substantially closed loop and a top portion of the loop is for engaging and supporting an underside of the transverse rods of the above belt tier.

8. A conveyor belt as in claim 7, wherein said substantially closed loop includes two substantially vertical legs for extending between adjacent belt tiers with each vertical leg having an end secured to said at least one link, and a substantially horizontal leg joining the vertical legs for abutting and supporting an underside of the transverse rods in an overlying belt tier.

9. A conveyor belt as in claim 8, wherein said vertical legs are spaced apart a greater distance at the top portion of the loop than at a portion of the loop adjacent said at least one link.

10. A conveyor belt as in claim 9, wherein said substantially closed loop is angled with respect to a direction of belt travel for allowing adjacent spacers to overlap when the belt assumes a curved configuration, or traverses a sprocket or pulley in a straight-line configuration.

11. A conveyor belt as in claim 1, wherein said spacers include at least one wire member with two ends, one end of the wire member being secured to one of said plurality of links, and the other end of said wire member extending outwardly from the one link away from the edge of the belt for engagement by means for feeding or removing said belt from said helical belt stack.

12. A conveyor belt as in claim 2, wherein said wire member has a circular cross-section.

13. A conveyor belt as in claim 2, wherein said spacers are means is for contacting an overlay disposed about the plurality of transverse rods of the belt.

14. A conveyor belt as in claim 2, including means for extending the thickness of at least one of said plurality of rods so that the rod is substantially coextensive with said at least one link to allow a guide rail to move along the underside of the belt between said wire member and an outer edge of the belt without getting caught on said link.

15. A conveyor belt as in claim 14, wherein said means for extending the rod includes a tubular spacing member disposed around the rod adjacent to said at least one link to allow the guide rail to move along the underside of the belt between said wire member and an outer edge of the belt without getting caught on said link.

16. A conveyor belt as in claim 14, wherein said means for extending the rod includes forming the rod with an enlarged cross-sectional area adjacent said link to allow the guide rail to move along the underside of the belt between said wire member and an outer edge of the belt without getting caught on said link.

17. A conveyor belt as in claim 16, wherein the rod is formed with an enlarged cross-sectional area over substantially its entire length.

18. A conveyor belt as in claim 1, wherein said spacers include at least one wire member secured to a support member sandwiched between one of said plurality of links and an end of one of said plurality of transverse rods.

19. A conveyor belt as in claim 18, wherein said support member is sandwiched between said one link and at least one reinforcing link, the reinforcing link being adjacent the end of said one rod.

20. A conveyor belt as in claim 1, wherein said belt has two opposite side edges and said spacers are secured to the belt adjacent to and along both side edges to support an overlying belt tier.

21. A conveyor belt having a length, a portion of the length being arranged to follow a helical path including a plurality of stacked tiers; said belt comprising:
a plurality of link members;
a plurality of cross members extending between lateral edges of the belt and being attached to said plurality of link members; and
a plurality of wire-formed spacers having a circular cross-section being secured to said belt for contacting an overlying belt tier to space and support adjacent tiers of the belt stack.

22. A conveyor belt as in claim 21, wherein each wire-formed spacer has two ends and each end is secured to a support member formed as an integral extension of at least one of the plurality of links.

23. A conveyor belt as in claim 21, wherein the wire-formed spacer has two ends and each end is secured to a support member which is separate from and secured to at least one of the plurality of links.

24. A conveyor belt as in claim 22, wherein the two ends of said wire member are secured to the support member so as to be spaced in a direction extending between the side edges of the belt to provide the spacer means with a wide base for increased lateral stability.

25. A conveyor belt as in claim 23, wherein the two ends of said wire member are secured to the support member so as to be spaced in a direction extending between the side edges of the belt to provide the spacer means with a wide base for increased lateral stability.

26. A conveyor belt as in claim 21, wherein each wire-formed spacer is in the form of a substantially closed loop and a top portion of the loop is for engaging and supporting an underside of the transverse rods of the above belt tier.

27. A conveyor belt as in claim 26, wherein said substantially closed loop includes two substantially vertical legs for extending between adjacent belt tiers with each vertical leg having an end secured to at least one of said links, and a substantially horizontal leg joining the vertical legs for abutting and supporting an underside of the cross members in an overlying belt tier.

28. A conveyor belt as in claim 27, wherein said vertical legs are spaced apart a greater distance at the top portion of the loop than at a portion of the loop adjacent said at least one link.

29. A conveyor belt as in claim 26, wherein said substantially closed loop is angled with respect to a direction of belt travel for allowing adjacent spacer means to overlap when the belt assumes a curved configuration, or traverses a sprocket or pulley in a straight-line configuration.

30. A conveyor belt as in claim 21, wherein at least one of said wire-formed spacers is secured to a support member disposed between one of said plurality of links and an end of one of said plurality of cross members.

31. A conveyor belt as in claim 21, wherein said belt has two opposite side edges and said wire-formed spacers are secured to the belt adjacent to and along both side edges to support an overlying belt tier.

32. A conveyor belt having a length, a portion of which is arranged to follow a helical path including a plurality of stacked tiers; said belt comprising:
a plurality of interconnected link members on opposite sides of the belt;
a plurality of transverse rods connected to said link members to form a belt with two sides, the belt being collapsible or extendible along at least one of said sides to follow the helical path, at least some of the rods having ends which are free of protrusions or enlarged heads;
a tab portion formed on at least some of of said link members on a portion thereof disposed away from center of the belt, the tab being attached to the end of one off said rods to pivotally interconnect said plurality of link members and
a plurality of spacer members secured to the belt so as to support an overlying belt tier by contacting the transverse rods of said overlying tier, each spacer member comprising a wire member substantially in the form of a closed loop having vertical legs which are connected to a top leg for contacting the overlying tier, and wherein an end of each vertical leg is secured to said belt such that the vertical legs are spaced apart a greater distance at a top portion of the closed loop than at a portion of the loop adjacent the belt.

33. A conveyor belt as in claim 32, wherein the ends of said rods which are free of protrusions or enlarged heads are welded to the tab portion of respective link members.

34. A conveyor belt as in claim 33, wherein a cap member of non-metallic material is removably secured to the tab portion of said link members.

35. A conveyor belt as in claim 34, wherein the cap member is plastic and has a protuberance which cooperates with an opening in the tab portion for securing the cap member to the link member.

36. A conveyor belt as in claim 32, including means for extending the thickness of at least one of said plurality of rods so that the rod is substantially coextensive with said at least one link to allow a guide rail to move along the underside of the belt between said wire member and an outer edge of the belt without getting caught on said link.

37. A conveyor belt as in claim 36, wherein said means for extending the rod includes a tubular spacing member disposed around the rod adjacent to said at least one link to allow the guide rail to move along the underside of the belt between said wire member and an outer edge of the belt without getting caught on said link.

38. A conveyor belt having a length, a portion of which is arranged to follow a helical path including a plurality of stacked tiers; said belt comprising:
a plurality of interconnected link members on opposite sides of the belt;
a plurality of transverse rods connected to said link members to form a belt with two sides, the belt being collapsible or extendible along at least one of said sides to follow the helical path, at least some of the rods having ends which are free of protrusions or enlarged heads;
a tab portion formed on at least some of said link members at an area of the link disposed away from a center of the belt, the tab being attached to the end of one of said rods to pivotally interconnect said plurality of link members; and
a plurality of wire-formed spacers having a circular cross-section being secured to said belt for contacting an overlying belt tier to space and support adjacent tiers of the belt stack.

39. A conveyor belt as in claim 38, wherein each wire-formed spacer is in the form of a substantially closed loop and a top portion of the loop is for engaging and supporting an underside of the transverse rods of the above belt tier.

40. A conveyor belt as in claim 39, wherein said substantially closed loop is angled with respect to a direction of belt travel for allowing adjacent spacer means to overlap when the belt assumes a curved configuration, or traverses a sprocket or pulley in a straight-line configuration.

41. A conveyor belt having a length, a portion of the length being arranged to follow a helical path including a plurality of stacked tiers; said belt comprising:
a plurality of link members;
a plurality of cross members extending between lateral edges of the belt and being attached to said plurality of link members and
a plurality of wire-formed spacers secured to said belt for contacting an overlying belt tier to space and support adjacent tiers of the belt stack;
wherein each of the wire-formed spacers includes an elongated wire member having two ends secured to the belt adjacent one of the link members such that the two ends are offset with respect to each other along a direction across the width of the belt to provide the spacer with a wide base for lateral stability.

42. A conveyor belt as in claim 41, wherein said elongated wire member has a circular cross section.

43. A conveyor belt having a length, a portion of which is arranged to follow a helical path including a plurality of stacked tiers; said belt comprising:
a plurality of interconnected link members on opposite sides of the belt;
a plurality of transverse rods connected to said link members to form a belt with two sides, the belt being collapsible or extendible along at least one of said sides to follow the helical path, at least some of the rods having ends which are free of protrusions or enlarged heads; and a tab portion formed on at least some of said link members on a portion thereof disposed away from a center of the belt, the tab being attached to the end of one of said rods to pivotally interconnect said pluralities of link ends, and wherein a cap member is removably secured to the tab portion of at least some of said link members.

44. A conveyor belt as in claim 43, wherein the cap member is made of a non-metallic material.

45. A conveyor belt as in claim 44, wherein the cap member is made of plastic.

46. A conveyor belt having a length, a portion of which is arranged to follow a helical path including a plurality of stacked tiers; said belt comprising:
- a plurality of interconnected link members on opposite sides of the belt;
- a plurality of transverse rods connected to said link members to form a belt with two sides, the belt being collapsible or extendible along at least one of said sides to follow the helical path, at least some of the rods having ends which are free of protrusions or enlarged heads;
- a tab portion formed on at least some of said link members on a portion thereof disposed away from a center of the belt, the tab being attached to the end of one of said rods to pivotally interconnect said plurality of link members; and
- means for extending the thickness of at least of said plurality of rods so that the rod is substantially coextensive with at least one link member to form a smooth surface on the underside of the belt to allow a guide rail to move along the underside of the belt between said wire member and an outer edge of the belt without getting caught on said link.

* * * * *

UNITED STATES PATENT AND TRADEMARK OFFICE
CERTIFICATE OF CORRECTION

PATENT NO. : 5,350,056
DATED : September 27, 1994
INVENTOR(S) : Michael L. Hager It is certified that error appears in the above-identified patent and that said Letters Patent is hereby corrected as shown below:

Col. 2, line 24, after "sproket" insert --in--.

Col. 3, line 29, "to,provide" should be --to provide--.

Col. 8, line 62, after "comprising:" start a new paragraph.

Col. 9, line 62, delete "means is".

Col. 11, line 38, "off" should be --of--.

Signed and Sealed this

Twenty-eight Day of March, 1995

Attest:

BRUCE LEHMAN

*Attesting Officer*  *Commissioner of Patents and Trademarks*